Aug. 30, 1955  R. HILSTROM  2,716,287

GAGES FOR MEASURING IRREGULARLY-SHAPED ARTICLES

Filed Nov. 5, 1953

INVENTOR
R. HILSTROM
BY
*C. B. Hamilton*
ATTORNEY

United States Patent Office 2,716,287
Patented Aug. 30, 1955

2,716,287

GAGES FOR MEASURING IRREGULARLY-SHAPED ARTICLES

Roland Hilstrom, Chicago, Ill., assignor to Western Electric Company, Incorporated, New York, N. Y., a corporation of New York Application November 5, 1953, Serial No. 390,366

5 Claims. (Cl. 33—174)

---

This invention relates to gages for measuring irregularly-shaped articles, and more particularly to gages for measuring the contours of cams.

An object of the invention is to provide new and improved gages for measuring irregularly-shaped articles.

Another object of the invention is to provide gages for measuring contours of cams.

A further object of the invention is to provide gages for checking dimensions of a cam simply and effectively.

A gage illustrating certain features of the invention may include a generally cylindrical block provided with a plurality of flat faces spaced around the periphery thereof, each flat face being designed to rest on a level surface. Each face is spaced a predetermined distance from a point on one end of the block so that a point on a cam to be measured secured to that end of the block in an oriented position can be measured from that face.

Figure 1:
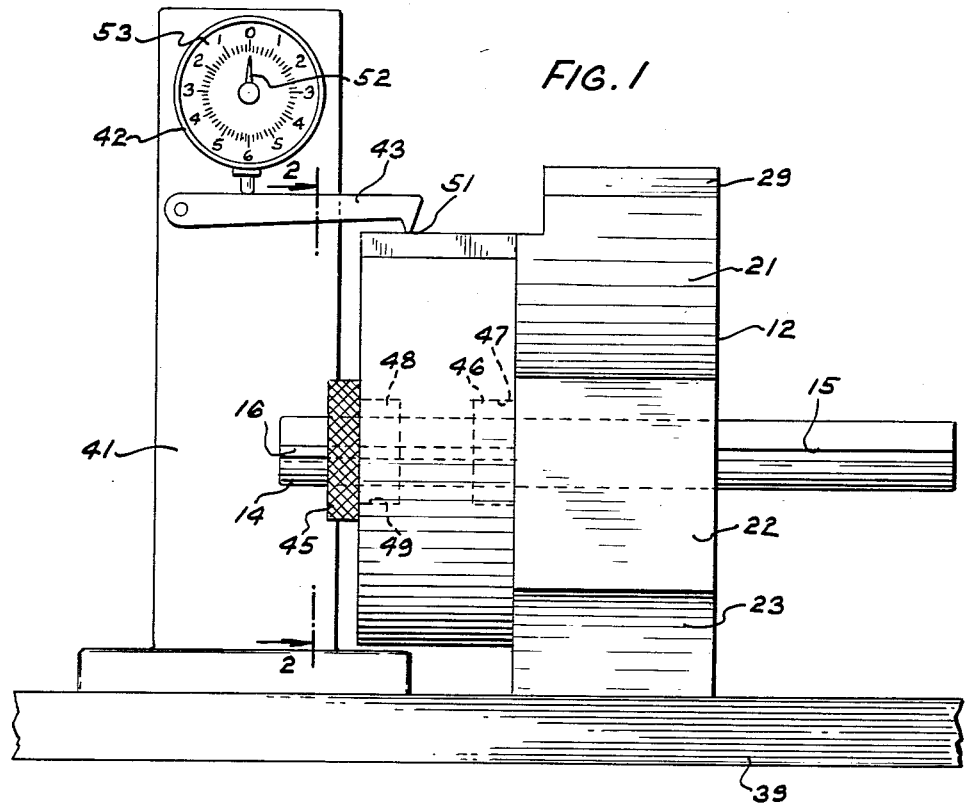
Figure 2:
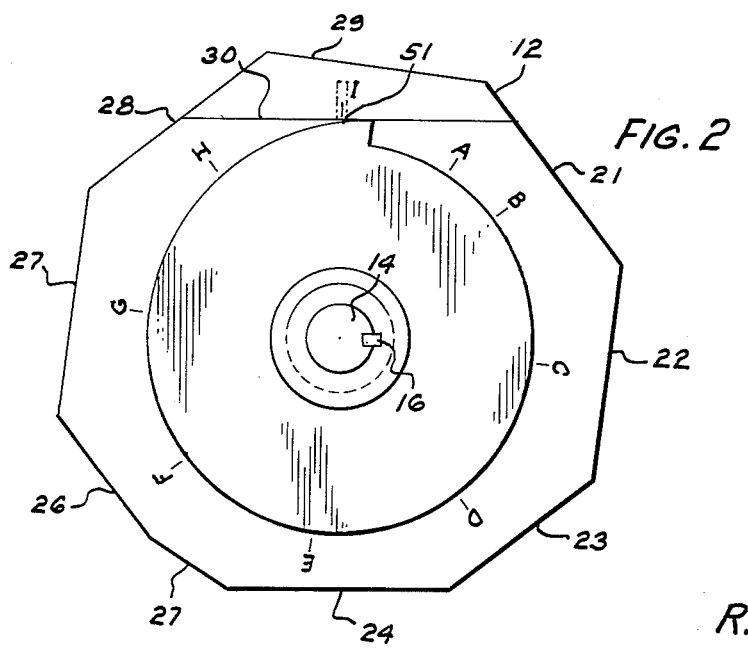

A complete understanding of the invention may be obtained from the following detailed description of a gage forming a specific embodiment thereof, when read in conjunction with the appended drawings, in which Fig. 1 is a fragmentary, front elevational view of a gage forming one embodiment of the invention, and Fig. 2 is a vertical section taken along line 2—2 of Fig. 1.

Referring now in detail to the drawings, there is shown therein a gage for measuring the distances from points on a cam 10 to the axis of rotation of the cam to determine whether these distances are within allowable limits. The gage includes a block or cylinder 12 provided with a shaft or arbor 13 projecting from one side thereof, and a shaft or arbor 14 projecting from the opposite side thereof, each of the shafts 13 and 14 being integral with the block 12 and having keyways 15 and 16 formed therein, the shaft 13 being slightly smaller than the shaft 14.

The cylinder 12 is provided with flats 21, 22, 23, 24, 25, 26, 27, 28 and 29, the flats being predetermined distances from the aligned axes of the shafts 13 and 14. Each flat is perpendicular to a line from the point on the cam to be checked thereby through the axis of the shafts 14 and 15 and the cylinder 12. The position and number of flats correspond to the location of and number of points on the cam to be checked. A reference shoulder 30 parallel to the flat 24 is formed on the block 12. The distance between the flat 24 and the shoulder 30 is equal to the distance that should be between a point on the cam adjacent to a scribe mark designated by the letter A on the block 12 if the point of the cam at the point A is at the proper elevation. The distance that each of the flats 25, 26, 27, 28, 29, 21, 22 and 23 from the axis of the shafts 14 and 13 and the cylinder is determined by subtracting the cam dimension from the point on the cam opposite to that flat to the axis of the cylinder and shafts from the distance between a reference surface 30 and the flat 24. Thus, the distance between the shoulder 30 and the flat 24 also is equal to that between the flat 26 and a point on the cam at a scribe mark adjacent the letter B, if the point on the cam is correct. Similarly this distance is the same as the desired distances between the points on the cam at scribe marks indictaed by the letters C, D, E, F, G and H and flats 27, 28, 29, 21, 22 and 23, respectively.

In the operation of the gage to check the finished cam 10, the cylinder 12 is placed on a plane surface 40 of a table 39 for supporting a standard 41 carrying a dial indicator gage 42 thereon operable by an arm 43, which is urged in a counterclockwise direction by a spring-pressed plunger 44 of the dial indicator gage 42. The cam 10 is keyed to the shaft 14 to orient the cam 10 with respect to the shaft 14 and the cylinder 12, and a bushing 45 fitting closely on the shaft 14 is slid on the shaft 14 to hold the cam on the shaft. A boss 46 formed on the shaft fits in a counterbore 47 formed in one side of the cam 10 and a boss 48 formed on the bushing 45 fits into a counterbore 49 in the cam 10, the counterbores 47 and 49 being aligned to receive bearings in the actual use of the cam 10.

The cylinder 12 is rotated, if necessary, to a position in which the flat 24 rests on the surface 40, and the standard 41 is placed in a position in which the base of the standard 41 rests on the surface 40 and a point 51 on the arm 43 rests on the shoulder 30. The dial indicator gage then is adjusted, if necessary, so that a pointer 52 thereof reads zero on a dial 53 of the dial indicator gage. The standard 41 then is moved to a position in which the point 51 engages only the cam at the point at the scribe mark adjacent to the letter I and the dial indicator gage 42 indicates whether this point is at the same level as the shoulder 30 as this point should be.

The block 12 then is rotated successively to successively rest on the flats 25, 26, 27, 28, 29, 21, 22 and 23, and the pointer 52 is placed successively in engagement with the points on the cam opposite to each of these flats as the cylinder 12 rests on that flat. If each of these points is perfect, the dial indicator gage 42 will read zero, while if any of these points is not at the desired position, the deviation in elevation from that position will be indicated by the indicator gage 42.

The shaft 13 is provided for checking cams such as the cam 10 while in their rough condition before being machined to their precise dimension. The end of the cylinder 12 opposite to that shown in Fig. 2 has indicia identical to the indicia on the shown face. The shaft 13 is smaller than the shaft 14 for checking cams prior to the milling out of the bore in the cam to give the bore its finished dimension. Thus, the gage checks the peripheral contour of the cams in their rough condition in the same manner that the finished peripheries of the cams such as the cam 10 are checked.

The above-described gage serves to rapidly and accurately check cams without requiring an operator to keep all the dimensions of each point on a cam in mind, and is simple and foolproof in construction and operation. The gage may be provided with more or less flats according to the number of points to be checked for any cam to be checked, and may be formed with flats to check any irregularly-shaped article.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A gage for checking irregularly-shaped articles, which a cylinder provided with flats thereon forming peripheral sides thereof for checking an article having a predetermined contour, means for mounting the article in a predetermined fixed position at one end of the cylinder, each flat on the cylinder being a distance away from the axis of the cylinder such that each flat is the same distance from the point on the article on the opposite side of the article from that flat if the points are correct.

2. A gage for checking irregularly-shaped articles, which comprises a cylinder provided with flats spaced around the periphery thereof forming sides thereof for checking an article having a predetermined irregular contour, each flat on the cylinder being such a distance away from the axis of the cylinder that points on the flats form a contour varying identically with the desired contour of the article but reversed with respect thereto, and means for holding the article in a fixed position centered with and at one end of the cylinder 180° out of phase with the cylinder, whereby the distance from each flat to the high point on the cam adjacent to the opposite side of the cylinder should be identical with those between each other flat and the corresponding point on the article.

3. A gage for checking cams, which comprises a cylinder having a shaft projecting from one side thereof for mounting a cam thereon, means for keying a cam to the shaft in an oriented position with respect to the cylinder, said cylinder having a plurality of flats forming the sides of the cylinder, said flats varying in distance away from the axis of the shaft such that the distance from a flat to the high point of the cam on the opposite side thereof is always equal to the distance from the other flat to the high points opposite those flats if the points on the cam are at the correct elevations therefor.

4. A gage for checking cams, which comprises a cylinder having a shaft projecting from one side thereof for mounting a cam thereon, means for keying the cam to the shaft in an oriented position with respect to the cylinder, said cylinder having a plurality of peripheral flats forming sides of the cylinder, said flats being so spaced from the axis of the shaft that the distances between points on the flats to the high points of the cam on the opposite sides from the flats are equal if the cam is accurate in contour, the dimensions of the cylinder being such relative to those of the cam that the cylinder projects radially beyond the cam, whereby the cylinder may be supported by any of the flats.

5. A gage for checking cams, which comprises a cylinder having a shaft projecting from one side thereof for mounting a cam thereon, means for keying the cam to the shaft in an oriented position with respect to the cylinder, said cylinder having a plurality of flats forming sides thereof, said flats so varying in distance from the axis of the shaft that the distances are equal between each flat and the high point of the cam on the opposite side thereof if the points on the cam are correctly positioned, said cylinder having a set-up flat thereon opposite to one of said flats and spaced from said flat a distance equal to the desired distance between each flat and the high point on the cam opposite to that flat.

References Cited in the file of this patent

UNITED STATES PATENTS

| 924,877 | Banfill | June 15, 1909 |
| 1,268,814 | Blomstrom | June 11, 1918 |
| 2,375,945 | Redmer | May 15, 1945 |